United States Patent [19]
Birk et al.

[11] 4,146,924
[45] Mar. 27, 1979

[54] SYSTEM FOR VISUALLY DETERMINING POSITION IN SPACE AND/OR ORIENTATION IN SPACE AND APPARATUS EMPLOYING SAME

[75] Inventors: John R. Birk, Peacedale; Robert B. Kelley, Kingston, both of R.I.; David A. Seres, Newark, Del.

[73] Assignee: Board of Regents for Education of the State of Rhode Island, Providence, R.I.

[21] Appl. No.: 615,716

[22] Filed: Sep. 22, 1975

[51] Int. Cl.² .................. G05B 19/42; G06F 15/46
[52] U.S. Cl. .......................................... 364/513; 414/5; 318/568; 318/640; 358/903; 364/515; 364/559
[58] Field of Search ............... 235/151, 151.1, 151.11; 444/1; 340/172.5; 364/513, 514, 120, 559, 300; 214/1 CM; 178/DIG. 21, DIG. 22, DIG. 36; 318/640, 567, 568

[56] References Cited
U.S. PATENT DOCUMENTS

| | | | |
|---|---|---|---|
| 3,216,311 | 11/1965 | Biberro et al. | 178/DIG. 36 |
| 3,454,169 | 7/1969 | Bridges | 214/1 CM |
| 3,589,134 | 6/1971 | Hackmann et al. | 214/1 CM X |
| 3,669,549 | 6/1972 | Besson et al. | 318/640 X |
| 3,804,270 | 4/1974 | Michaud et al. | 214/1 CM X |
| 3,850,313 | 11/1974 | Rackman et al. | 214/1 CM X |
| 3,888,362 | 6/1975 | Fletcher | 214/1 CM X |
| 3,890,552 | 6/1975 | Devol et al. | 318/568 |

Primary Examiner—Joseph F. Ruggiero

[57] ABSTRACT

Visual system for determining position in space and/or orientation in three-dimensional space for purposes, for example, of directing or instructing an industrial robot to perform manipulative acts and apparatus employing the visual system. The system includes a portable object arbitrarily movable in three-dimensional space and possessing the discernible properties of position in space and/or orientation in space. One or more sensors extract visual information or image data from the portable object and convert the same to an electric signal or signals. A computer is connected to receive the signal or signals which are analyzed and, in the case of the industrial robot, the information obtained is used to prepare operating instructions.

61 Claims, 13 Drawing Figures

SYSTEM FOR VISUALLY DETERMINING POSITION IN SPACE AND/OR ORIENTATION IN SPACE AND APPARATUS EMPLOYING SAME

The present invention relates to systems for determining position in space and/or orientation in space, that may be used, for example, to instruct an industrial robot, and the apparatus employing such systems.

There accompanies herewith a paper by the present inventors entitled "Visual Robot Instruction", Proceedings of the Fifth International Symposium on Industrial Robots, Chicago, Ill., Sept. 22-24, 1975; said paper is hereby incorporated herein by reference. Some, but not all, of the material in the paper is included hereinafter. Most of the description that follows is centered around instructing industrial-type robots, sometimes called programmable manipulators, but the concepts herein disclosed have wider use.

Industry demands a fast and safe method to program industrial robots. Prior proposals for such programming include the use of potentiometers, voice control, cathode ray tube (CRT) light pens, master-slave harnesses and manual controls, as is noted in said paper. Each programming aid offers advantages, but even when they are used together they cannot specify what a foreman easily tells a human operator. Each aid has distinct limitations. Programmers using potentiometers tend to move each degree-of-freedom one at a time. Joysticks provide some coordination in controlling two or three degress-of-freedom, but robots typically have more than three. Voice control is a convenient method for specifying incremental motion in world or hand coordinates; however, if the increment is numerically specified, performance is limited in speed by the programmer's ability to quantify his visual information. Using the voice control technique of moving the robot in slow motion until a "Stop" utterance is given may be susceptible to the problem of timing consistency on the part of the programmer. Additionally, voice control is not well suited to describing complex trajectories. Currently voice control is also an expensive programming aid. CRT light pens are convenient for specifying points on a plane; however specifying points in three dimensional space on two screens is difficult. Describing a trajectory is very difficult. The cost of CRTs must also be weighed in a decision to include this programming aid. The use of a master-slave harness is perhaps the most expensive robot programming aid. It is also limited in some ways to robots with an anthropoid configuration. For example, adjustments of harness elbow elevation to avoid an obstacle may not cause a non-anthropomorphic arm to adjust appropriately. The programming technique of physically leading a robot through a sequence of motions is limited by safety considerations. Uncontrolled behavior is possible if power assist is used.

When using most programming aids, programmers come close to the robot to inspect the location of the gripper. This proximity endangers the programmer. For safety, it is desirable if a sequence of motions could be specified with the programmer in the workspace and the robot inactive.

Accordingly, it is an object of the present invention to provide a system adapted to facilitate the instruction or programming of numerically-controlled, industrial robots to enable such robots to perform new or additional tasks.

Another object is to permit such instruction or programming in a way similar to that used by one human instructing another.

Still another object is to provide a system that points out obstacles to the robot.

A further object is to provide a system to aid in programming of other numerically-controlled machine such as, for example, numerically-controlled machine tools.

A still further object is to provide such programming in a manner that does not endanger a human operator.

A still further object is to provide a visual system for industrial robots and the like that need not be rigidly positioned relative to a work surface or space.

These and still further objects are discussed hereinafter and are delineated in the appended claims.

The foregoing objects are achieved in a visual system to determine position in three-dimensional space and/or orientation in three-dimensional space, which includes a portable object arbitrarily movable in three-dimensional space and possessing the discernible properties of position in space and/or orientation in space. One or more sensors extract visual information or image data from the portable object and convert that information to an electric signal or signals. A computer, properly programmed is connected to receive the signal or signals from the sensor or sensors and evaluate the same to provide an indication of position in three-dimensional space and/or orientation in three-dimensional space. The computer, on the basis of the information received and in the light of its pre-programs, prepares messages that may be transmitted to the mechanically-active elements of one or more robots which, in turn, act or perform some function on the basis of the messages received.

The invention is hereinafter described with reference to the accompanying drawing in which:

FIG. 6B is a diagrammatic representation, partly block diagram in form, of an actual industrial robot system that has been experimented with;

Figure 1:
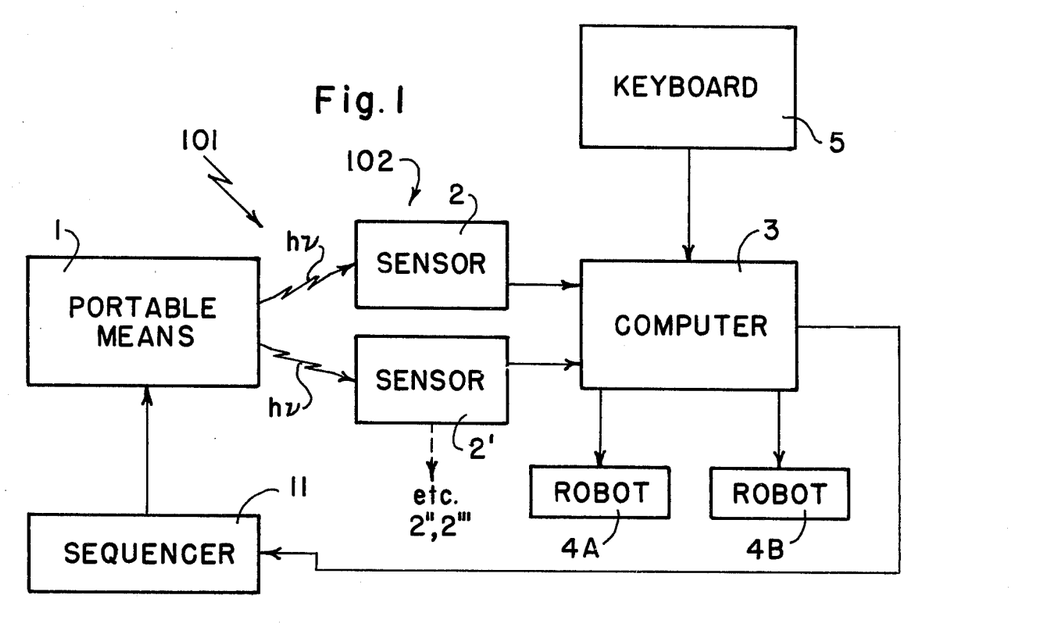
FIG. 1 is a diagrammatic representation of a system employing the present inventive concepts and shows, among other things, portable means and a plurality of sensors.

As will be evident as the story unfolds, what the present inventors have done here is present a surrogate for a thing to-be-sensed in three-dimensional space or for a point, a line, or the like in such space. From the surrogate, can be obtained visual information or image data that can be interpreted and then used. The apparatus designated 102 in FIG. 1 includes a visual system 101 to determine position in space and/or orientation in space; in FIG. 1 the surrogate is the portable means shown at 1. The portable means 1 is arbitrarily movable in three-dimensional space and, as later discussed in detail, possesses the discernible properties of position in space and orientation in space. Sensors 2, 2', etc., are positioned to extract visual information or data from the portable means 1 and are operable to convert the visual information or data to an electric signal or signals. A computer 3 is connected to receive the electric signal or signals from the sensors 2, 2'... and is programmed to evaluate the same to provide an indication of position in space and/or orientation in space on the basis thereof. The apparatus 102 further includes robots 4A, 4B, etc., whose actions and movements are controlled by the computer on the basis of the visual data, as discussed in detail in later paragraphs. For convenience of explanation the visual system 101 in FIG. 1 and later described systems 101A and 101B include those elements that have to do with locating coordinates in space, the term "robot" designates the mechanical elements that perform some mechanical act, and the term "machine" is used to designate the two combined with some work space (e.g., a machine tool).

Figure 2:
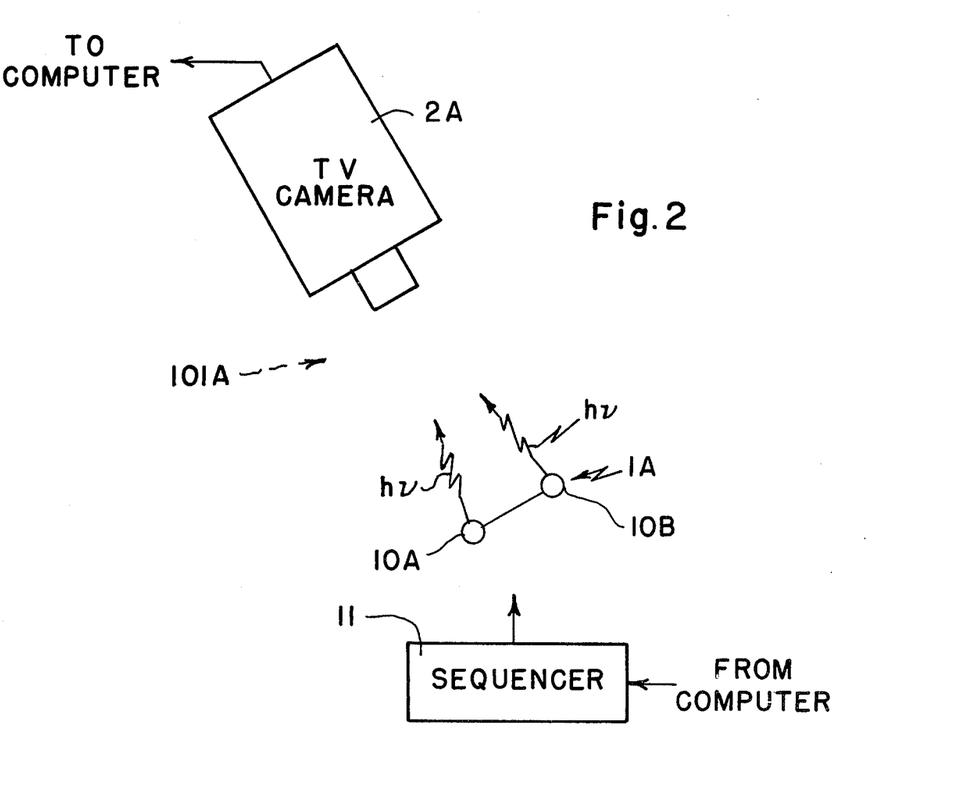
FIG. 2 is a schematic representation, partly block diagram in form, showing a portion of the system of FIG. 1, the portable means being two lights and the sensor being a television camera.

The portable means can be one or more lights; in FIG. 2 it is shown at 1A as two individual sources of light 10A and 10B. Each source acts effectively as a point source of light in the system 101A of FIG. 2. The sensor in FIG. 2 is a television camera 2A (two or more cameras can be employed). The lights 10A and 10B can be modulated ON-OFF, or their intensity and/or frequency can be modified by a sequencer 11 (the sequencer need not be a separate unit; sequencing functions can be performed by the computer); and the orientation of the lights in space and relative to the camera can be changed as now explained with reference to FIG. 3 wherein the elements 1A and a keyboard 5A are combined in a single portable unit or visual programming device (VPD) that is marked 20.

Figure 3:
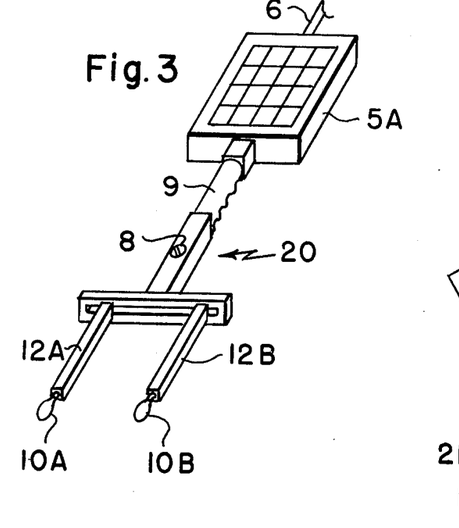
FIG. 3 is an isometric view of some of the elements shown in block diagram form as separate elements in FIG. 1 but combined in FIG. 3.

In the device 20, the lights are again designated 10A and 10B and the distance separating them can be changed by an operator using a control switch 8 which operates an activator (e.g., small electric motor or solenoid not shown). The device 20 is moved about by an operator who grasps the same at a hand grip 9. Electric power to the device 20 is connected through a cord 6 which serves, as well, to transmit messages between the device 20 and the computer 3.

The visual programming device 20 can be used to conveniently communicate spatial information to an industrial robot to cause the robot to perform some task such as, for example, to grasp an object in its gripper. It is held in a programmer's hand. It has an array of lights, the lights 10A and 10B, at one end, and a set of switches, the keyboard 5A, at the other end. The switches communicate information to the computer which, as previously noted, activates the robot (or robots). The lights may be under computer control. The VPD 20 shown has the lights 10A and 10B at the tips of a parallel jaw structure. This structure enables the two lights to be placed on opposite sides of an object, for example. The center of the two lights would, in this circumstance, correspond to a position that the programmer wants the center of the robot's gripper (see fingers 70 and 71 in FIG. 6A) to assume. A motor activated by the switch 8 on the VPD controls the distance between the two lights 10A and 10B, as previously discussed. Distance information may be sensed and communicated to the control computer 3. This information may be used to verify visual computations. The distance between light support members 12A and 12B can be made large to surround large objects without blocking the line of sight from the TV camera 2A to the lights 10A and 10B. This distance can be made small to avoid interference with work station structures. Although programming can be done with the workpiece in position, workpiece presence is not required by the visual programming technique herein disclosed.

If the vision system has one television camera, as it has in FIG. 2, the image of a small light can only specify a point in a plane. This plane may be horizontal and just above the dominant materials handling surface of the workstation. To specify points in space only a single light is necessary. A switch on the keyboard 5A can be pressed to record each point, a numerical keyboard entry may be used to specify how far beyond or inside the reference plane is the three dimensional command point. This three dimensional approach suffers either from inaccuracies in estimated distances or a time consuming measurement process. For applications where pick and place points are in the same plane, a vision system with one television camera may suffice. Macros such as "go forward to reference plane, close gripper, back off from reference plane" might be issued with a single placement of the VPD 20 and activation of a particular switch on the VPD keyboard 5A.

Figure 4:
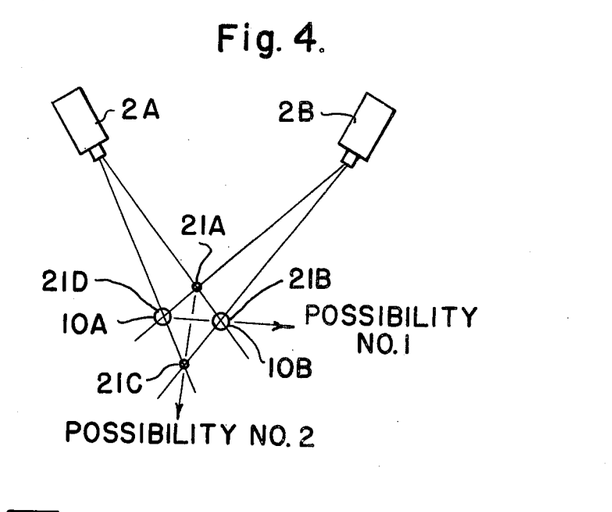
FIG. 4 is a schematic representation, partly block diagram in form, of a modification of the system of FIG. 2 in that the later figure shows two cameras.

If the vision system has two television cameras, as shown at 2A and 2B in FIG. 4, the three-dimensional location of the lights on the VPD may be computed directly. The accuracy of this computation depends on the vision system. For fixed camera mounts, factors affecting accuracy include the field of view, spatial sampling rate, inter-camera geometry, location of lights relative to television cameras, and camera geometric distortion. To quantify the magnitude of the accuracy issue, one can assume a 100 cm line in a reference plane perpendicular to the optical axis. If this line covers a horizontal scan line with 250 samples/line and the light activates a single picture element, location is theoretically limited to $\pm$ 2 mm. For cameras with pan/tilt mounts, precision servo-mechanisms are important.

To describe the proper way to grasp a workpiece, the vector from one robot fingertip to the other fingertip must be specified. For this purpose, the design of FIG. 3 is also appropriate. Each light specifies where each robot fingertip (the robot's fingers are marked 70 and 71 in FIG. 6A and the fingertips are marked 70A and 71A, respectively) is to be before a grasping instruction is issued. The centroid between fingertips (points in space) and orientation between fingertips may be specified at the same time. However, if a light is obscured, fingertip orientation may be specified elsewhere in the field of view. Activation of switches on the keyboard 5A may be used to tell the system how to interpret the visual instruction. Three types of instruction have been described thus far: (1) point in space, (2) orientation between fingertips, and (3) point in space plus orientation between fingertips.

If a VPD with just one light is used, positions and orientation between fingertips cannot be specified at the same time. However, this can be done in a two-step procedure. Activation of one control switch specifies a point in space. Activation of another switch signals the computer to use the present light position and the most recently specified position to compute an interfingertips direction vector.

If the two light VPD in FIG. 3 is used to specify a unique orientation between a pair of robot fingertips which are structurally different, a distinction between the two lights must be made. This distinction is possible using colored lights, but then the television camera must have provisions for color vision. Another method of distinguishing lights is to turn them on and off sequentially by the sequence 11 under the proper control of the computer 3. With this scheme, each light is sensed during a different frame of the television camera. The time required for this technique is limited by turn-on and turn-off times of the lights and of the photosensitive element of the television camera. Lights may also be distinguished by size or intensity. Intensity discrimination requires a grey scale interface between the television camera and the computer. Light size does not map directly to image size due to distance attenuation and directionality of light sources.

A distinction between lights is also useful for the case depicted in FIG. 4 wherein it is assumed that the four points of ray intersection marked 21A, 21B, 21C and 21D are in the same plane. In this case, it is not possible to distinguish from the light image geometry which of the two combinations of positions is actually the case without further measures. Even interlight distance information will not always lead to a distinction between the two cases since both possibilities may have the same interlight distance. The region in space where interlight distance is the same is a function of the angle between the optical axes of the two television cameras 2A and 2B. This region in space is widened by limitations on estimating distances using stereo vision. To overcome the ambiguity presented by the configuration of FIG. 4, it is necessary to identify the individual light 10A and 10B by, for example, the ON-OFF procedure above-described.

Figure 6A:
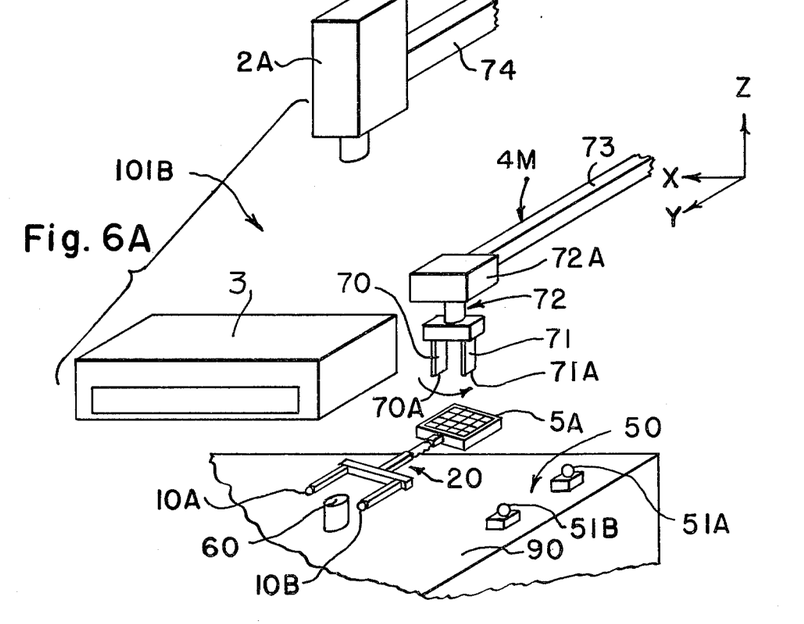
FIG. 6A is an isometric, diagrammatic representation of a machine that includes the present teachings.

In addition to the vector between robot fingertips 70A and 71A, a vector pointing in the direction of the fingers 70 and 71 in FIG. 6A will frequently have to be specified. For example, to make more rigid contact with a particular class of workpiece, robot fingers may have contact surfaces which are not symmetric. Another reason for wanting to specify finger direction is to prevent the wrist structure shown at 72 in FIG. 6A from colliding with workstation structures.

Figures 5A, 5B, 5C:
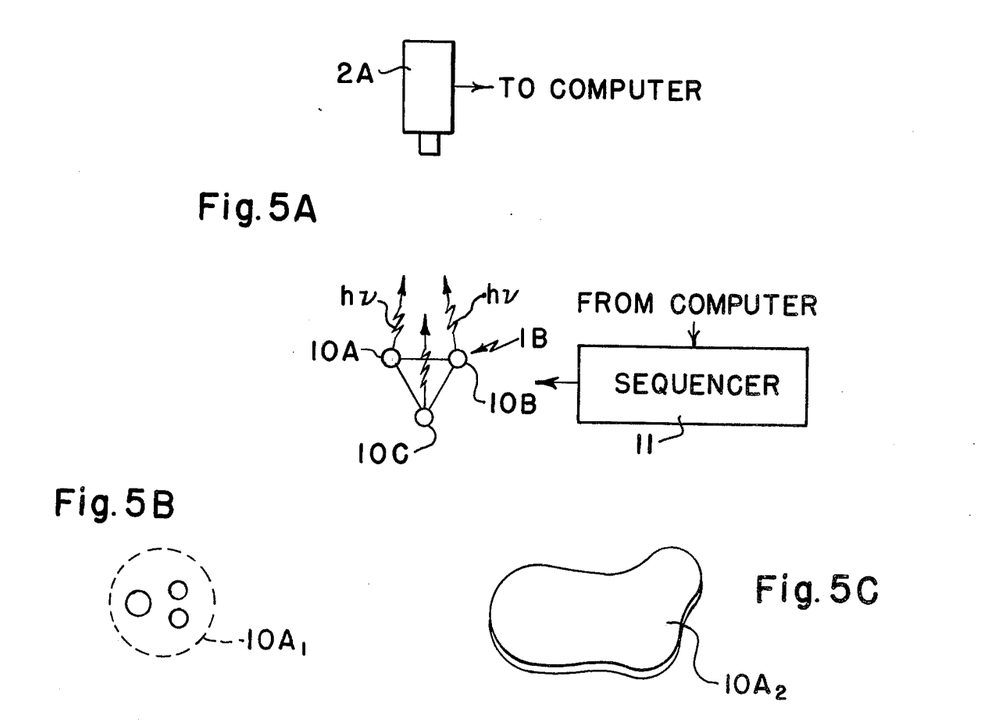
FIG. 5A shows a single camera as a sensor and portable means composed of three lights or light sources.
FIG. 5B shows a cluster of lights which, together, form a single light source of a type that can be employed as any one of the light sources in FIG. 5A.
FIG. 5C shows an arbitrarily-shaped distributed light source that can be used in FIG. 5A.

Finger direction can be specified by a third light in the array 1B as shown in FIG. 5 wherein the third light is labeled 10C. Assuming that the three lights can be located and distinguished, a robot finger direction vector can be computed which is in the plane defined by lights 10A and 10B and the third light 10C. The finger direction vector may be specified as being perpendicular to the line between lights 10A and 10B and passing through the third light 10C. Finger direction can also be specified by using a VPD with a single light, as above noted; in this latter case the light would be located where the third light is located using the three-light technique. Activation of a switch on the keyboard tells the computer to interpret this single light location as data to specify finger direction relative to the most recent fingertips direction vector or to the most recently specified point in space.

For situations involving a vision system having a single television camera, as depicted in FIG. 2, it will often be adequate to make the general specification that robot finger direction is to be perpendicular to the reference plane. For other situations the general specification of a vertical finger direction (e.g., horizontal reference plane) will be appropriate.

Specification of trajectories is useful to avoid obstacles, contouring and for special applications such as, for example, paint spraying, welding or applying adhesives. A trajectory is specified by an initial gripper configuration (location and orientation), an ordered set of intermediate gripper configurations, a final gripper configuration and the time for transit between each adjacent pair of gripper configurations. The gripper passes through the intermediate gripper configurations without halting. Servomechanisms to achieve this form of motion are available.

As described above, a VPD can conveniently specify gripper configurations. Thus a VPD is a useful means to specify trajectories. A number of options are possible to specify the time for each segment of the trajectory. For many situations, it is appropriate to minimize the time to traverse a trajectory. A command on the keyboard 5A can specify the minimizing function. In this case, intermediate gripper configurations may be passed through with less accuracy. A second approach is to have keyboard entries specify the time for a trajectory segment immediately after specifying the concluding gripper configuration for that segment. Rather than use numerical entries, selection of standard "slow," "medium" and "high" speeds may be preferable. A third approach is to activate a realtime sampling algorithm. In this case the servo system would be instructed to replicate the timing of the robot programmer. Keyboard entries could specify if a fraction or a multiple of measured realtime performance was desired for playback.

The VPD 20 specifies gripper position and orientation. Robot arms with different kinematic and structural configurations will have links occupying different portions of a workspace for the same gripper position and orientation. Movement toward a particular gripper configuration may cause the problem of contact between an arm structure and a workstation structure. One solution to the problem is to use the VPD to specify a set of points from which an envelope of workstation structures can be computed. If such a set of points is specified before initiating standard VPD programming, a gripper configuration command can be refuted in the event that a collision is predicted. The robot programmer would be notified of the result so that he can try another gripper configuration.

For a robot arm with redundant degrees-of-freedom, a search can be conducted to select an arm configuration which avoids obstacles. Subsequent refinement of the search for an arm configuration would have as a goal the stipulation that the configuration be rapidly attained as an intermediary between the previous gripper configuration command and the next one. A scheme for modeling the outlines of obstacles and arm links is discussed in one of the references mentioned in said paper.

Figure 6B:
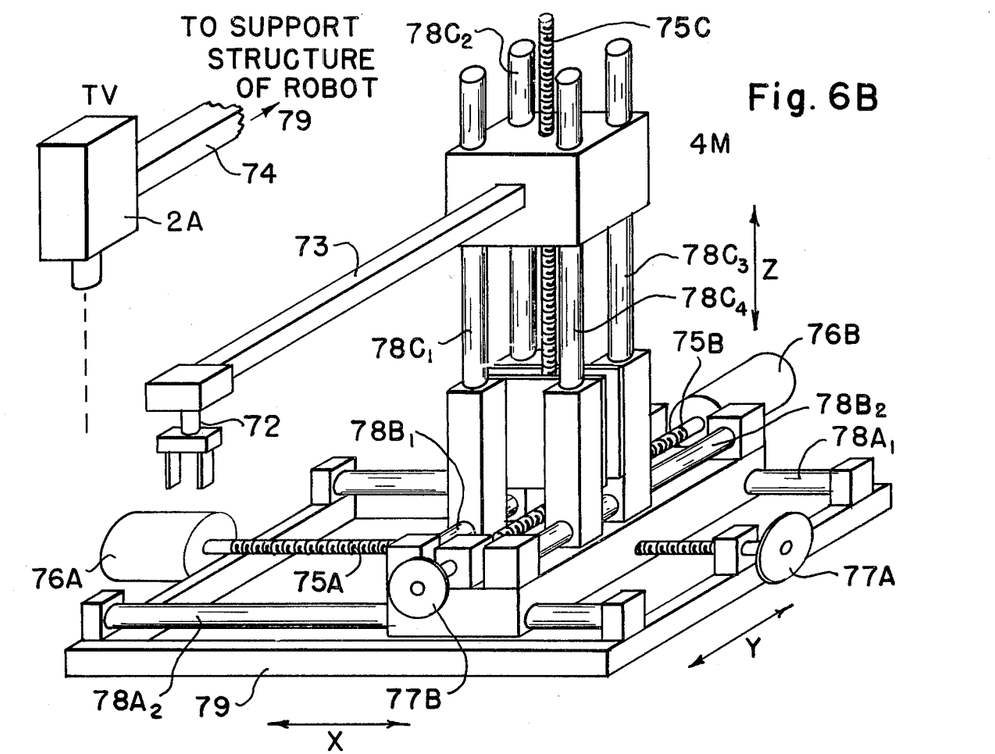

The explanation in this and the next several paragraphs is made with respect to FIGS. 6A and 6B. FIG.

6A illustrates diagrammatically what for present purposes is called a machine that is assigned the numeral 103; the machine 103 consists of a worktable 91 having a work surface 90, a visual system 101B and a robot 4M; other mechanical parts of the robot 4M are shown in FIG. 6B. In a sense, the whole of the elements in FIGS. 6A and 6B could be called a robot, but as used herein and as above noted, the term "robot" in all variations embraces the mechanical and electro-mechanical parts shown in some detail in FIG. 6B. Also, strictly speaking, the work surface 90 need not be part of a machine of which the robot 4M is also a part, but it can be; and it is assumed such for this explanation. Anyway, the cylindrical object labeled 60 in FIG. 6A is located or found within the working volume of the machine and, more precisely, its x-y coordinates are determined (its external dimensions are determinable, as well) by interaction between the VPD 20, the camera 2A and the computer 3, as now explained.

Figure 9:
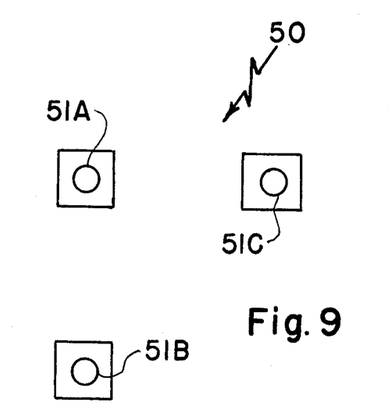
FIG. 9 shows a fiducial array.

Various x-y coordinates on the surface 90 are located with respect to fiducial or reference means 50 that comprises a plurality of lights 51A and 51B (there may also be three lights as shown in FIG. 9, or more, and each elements 51A ... need not be a light, nor a single light). The important matter here is that the location of the fiducial means 50 be fixed relative to the workable surface 90 or be determinable relative thereto. In FIG. 6A the TV camera 2A is attached to a camera arm 74. The camera arm 74 and the arm 73 of the robot 4M are assumed for present purposes to bear a known spatial relationship relative to one another and the computer 3 is pre-programmed to be aware of the relationship. The TV camera 2A is situated so as to be able to view the lights 51A, 51B, etc. in the same scene or separate scenes through pan and tilt motion of the camera. The visual location of the lights 51A, 51B, etc. is noted. These data are interpreted by the computer 3 to yield x-y coordinates of the fiducial means 50. In the same way, the location of the object 60 on the work surface 90 is achieved using the VPD 20 in the manner previously indicated. The TV camera 2A visually locates the VPD lights 10A, 10B. The computer 3 interprets these data to yield the x-y position of the object which is determined relative to the fiducial means 50. The robot 4M has an end effector or wrist structure 72 comprising the fingers 70 and 71, as previously mentioned. The computer 3 also extracts orientation information from the VPD data which permit the wrist structure 72 to be aligned for purposes of grasping the object 60 with the fingers 70 and 71. The end purpose here is to have the robot 4M grasp the object 60 in the fingers 70 and 71 and, say, move it to another location in the work space or volume.

The robot 4M can independently move the end effector 72 along each of three mutually orthogonal axes, one of which is perpendicular to the worktable surface 90. The robot 4M can also rotate the end effector 72 about an axis which is perpendicular to the worktable surface 90. The fingers 70 and 71 on the end effector 72 can be closed and opened to permit the robot to grasp and release the workpiece 60. The fiducial array 50 is rigidly attached to the worktable surface 90; the array 50 defines a vision/robot system invariant measurement coordinate system. The position and orientation information conveyed by the VPD 20 through the light sources 10A and 10B, as sensed by the TV camera 2A and extracted by the computer 3, is measured relative to the fiducial array position and orientation. This technique permits the VPD to be used in the absence of a robot and provides information which is independent of the particular robot employed (see a paper of the present inventors, Proceedings of the Third Milwaukee Symposium, Milwaukee, Wisc., April 18, 19, 1975, entitled "Robots with TV: Attaching Robots to Machines Thru Software" that accompanies herewith, which paper is hereby incorporated herein by reference). It should be noted here that the fiducial array 50 can have more than the three lights in FIG. 9 and each can take the form of the cluster 10A, in FIG. 5B; or the array 50 can be, in some instances, a plurality of distributed sources of the type shown in FIG. 5C. Also, the fiducial array need not be at any particular position relative to or on the surface 90; what is essential is that the fiducial means 50 bear some known or determinable spatial relationship to the work surface 90 or other work space so that once the fiducial means is found by the camera 2A then the location of all other parts of the work space can be accomplished.

The diagrammatic representation of the robot 4M in FIG. 6A is almost self-explanatory, but some features are pointed out here. Movement of the arm 73 in the x, y and z directions is effected by lead screws 75A, 75B and 75C, respectively, that are rotated by d-c servos 76A, 76B and 76C (not shown) respectively. The robot is mounted on a base 79 and ways $78A_1..., 78B_1...$ and $78C_1...$. Position information is obtained from coded discs 77A... using incremental angle encoder pickup counters (not shown). The wrist portion 72 of the arm 73 contains a stepping motor within the block marked 72A to effect rotation of the fingers and a solenoid and cable actuator moves the fingers 70 and 71 toward each other. As above noted, the x-y position of the TV camera 2A and the fingers 70 and 71 are indexed to one another so that a coordinate determined by the camera can be found by the fingers. In fact, the camera arm 74 is attached to the robot base structure 79 and its position in space thus is determinable. A detailed description now follows of a task that can be performed by an industrial robot, like the robot 4M.

A "pick and place" task may be described by a human instructor to a human operator as follows (refer to FIG. 7):

Take a part from this magazine and place it in that fixture like this. Next press both buttons at the same time to enable the power operation. Then remove the finished part from the fixture and place it on the conveyor like so. Now you are ready to repeat the cycle.

Figure 7:
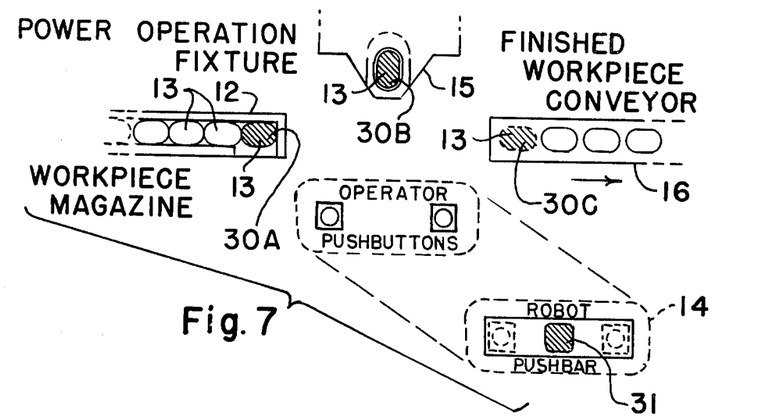
FIG. 7 shows a plan-view layout for a typical industrial operation for the robot of FIG. 6.

Let it be supposed now that a workstation, such as is shown in FIG. 7, is to be used by a robot such as the robot 4M. Because modifying the safety features of a workstation is not good practice, the dual pushbuttons may be operated by a single arm robot if a pushbar is attached as shown in FIG. 7. Such a bar could serve to satisfy the anti-repetition logic of the power device and also guarantee that the robot is safe. Furthermore, restoration for human operation is simple.

Task locations are shown crosshatched in FIG. 7; they are marked 30A, 30B and 30C for a workpiece 13 and 31 for a pushbar 14. The robot proceeds from the "home" position marked 000 in FIG. 8, takes the next workpiece labeled 13 (at location 30A) from the magazine shown at 12 and places it in the center of the fixture marked 15. Then the robot goes to the center of the pushbar, station 31 of the pushbar 14, and depresses it. Next the robot removes the workpiece 13 from the fixture 15 (location 30B) and places it at the open position on a conveyor 16 (location 30C). Finally, the robot returns to the home position 000 to complete the cycle.

Figure 8:
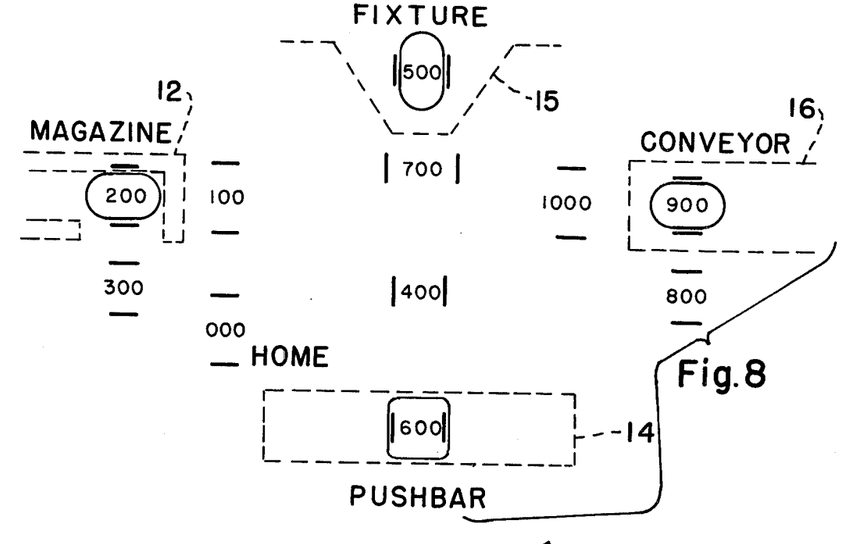
FIG. 8 is a plan view showing typical visual programming parts with respect to the locations of FIG. 7.

FIG. 8 shows typical visual programming points in relation to the locations identified in FIG. 7. These points represent the sequential positions of the robot as it performs the sample task. Point 000 is the home or rest position of the robot, as noted. Point 100 serves to align the robot gripper with the workpiece in the magazine 12. Point 200 is the pickup position. Point 300 shapes the robot trajectory to move the workpiece 13 out of the magazine 12 through a removal gap, Point 400 is an intermediate point to ensure workpiece rotation prior to placing the workpiece in the center of the fixture, point 500. Point 600 is the pushbar position. Point 700 is an intermediate alignment position prior to removing the workpiece from the fixture 15. Point 800 is an intermediate point to ensure workpiece rotation preparatory to placing the workpiece 13 on the conveyor, point 900. Point 1000 shapes the robot trajectory to guarantee that the robot gripper does not interfere with the workpiece as the robot returns to the home position, point 000.

A computer program to realize the cycle described in FIG. 8 might consist of the instructions listed below. User supplied data is indicated by numeric and lower case entries. Capitalized entries represent sample programming language primitives.

robot control commands. Before the computer can be run, it is necessary to supply all the position and wrist orientation data for each point. For visual robot instruction, the program and the data are generated in parallel. Such "on-site" programming naturally addresses questions such as gripper orientation, workpiece clearance, vertical/horizontal obstacle avoidance and approach/departure angles. This is because the human instructor must go through the same actions as the robot.

The software for the actual robot of the type diagrammatically represented in FIGS. 6A and 6B is divided into a resident robot control system (RCS) which is interrupt driven and resides in the background, and special purpose user programs which reside in the foreground. The main function of RCS is to execute robot control commands which are put into a common block of memory, the robot control block (RCB), by user programs. Information which is of potential use to foreground routines such as limit switch interrupts, visual data read in, motion request completed and the like is transferred through the RCB. In addition, RCS monitors the state of "health" of the entire robot system and takes appropriate action to prevent the robot from hurting itself, the environment, or the electronics.

Visual robot instruction is accomplished by sets of software modules grouped under the following catego-

```
BEGIN   home   WITH WRIST −90°, GRIPPER open   :comment, point 000
        GOTO   magazine, PICKUP                :point 200
               THRU point 100
        GOTO   fixture, RELEASE                :point 500
               THRU point 300
               THRU point 400 WITH WRIST 0°
        GOTO   pushbar, DEPRESS                :hold down point 600 at
                                                force limit
        WAIT   time out                        :for power operation
        GOTO   fixture, PICKUP                 :point 500
               THRU point 700
        GOTO   conveyor, RELEASE               :point 900
               THRU point 400
               THRU point 800 WITH WRIST −90°
        GOTO   home                            :point 000
               THRU point 1000
END
```

A corresponding "visual robot instruction" sequence for the same task is given in tabular form below. The program below is "written" through the following keyboard entry sequence.

ries: CALIBRATION, RECORD, EDIT and PLAYBACK.

CALIBRATION modules perform the following functions:

| VISION SYSTEM | | KEYBOARD | | |
|---|---|---|---|---|
| POSITION | WRIST | ENTRY | MEANING | COMMENT |
| Point 000 | −90° | B | begin | gripper open at beginning, home position |
| Point 100 | −90° | T | thru | specify intermediate point on trajectory. |
| Point 200 | −90° | P | pickup | go to pickup point, descend, grasp, ascend. |
| Point 300 | −90° | T | | |
| Point 400 | 0° | TM1 | memorize 1 | rotate enroute, memorize position and orientation of point 400 (reference point No. 1). |
| Point 500 | 0° | RM2 | release | go to release point, memorize point 500 (reference point No. 2). |
| Point 600 | 0° | D | depress | go to point 600, hold at force limit. |
| — | — | Wnnn | wait | nnn = time code. |
| Point 700 | 0° | T | | |
| — | — | PM2 | | go to memory reference point No. 2 (point 500) to pickup. |
| — | — | TM1 | | go thru memory reference point No. 1. (point 400). |
| Point 800 | −90° | T | | rotate enroute. |
| Point 900 | −90° | R | | |
| Point 1000 | −90° | T | | |
| | | E | end | end position equals home position. |

Both the computer program and the visual robot instruction program can be translated into equivalent (1) Arm travel limits are established for each degree-of-freedom. Contact with limit switches defines the mechanical restrictions to motion. Range of travel is only computed once for all instruction sequences.

(2) Incremental position encoders are initialized against limit switches and the wrist stepping motor is initialized against a mechanical stop each time power is re-applied to the robot.

(3) A reference plane height is defined for workpiece transport. This definition precedes each instruction sequence.

(4) For the reference plane selected, the conversion factors relating television intersample distance and robot encoder counts are computed. A light extending horizontally from the gripper, which is moved in the field of view at the reference height, provides data to compute these factors.

RECORD modules are used both during the instruction phase, to gather the original keyboard and visual data, and during the editing phase, when new information is inserted into the data list. These modules perform the following functions:

(1) Before keyboard entries, a fiducial array of lights, which is attached to the workstation is located. The use of a fiducial array permits points in space to be located relative to the workstation instead of relative of the robot (as previously explained). Thus the robot need not be rigidly attached to the workstation.

(2) VPD lights are located using low resolution and are tracked using high resolution during instruction. This procedure minimizes computational time and memory requirements at the moment a keyboard entry is made. An audio alarm informs the programmer in the event that the VPD lights are not being tracked and if he is in the RECORD mode.

(3) Keyboard status is monitored for codes to initiate the various forms of processing which couples the latest instruction into the new instruction sequence.

EDIT modules permit instructions to be verified one at a time. In addition, instructions may be deleted or added.

PLAYBACK modules perform the following functions:

(1) The location of the fiducial array is tracked to determine movement between the workstation and the robot.

(2) Playback of the instruction sequence occurs in two forms: single cycle and continuous cycle. Single cycle playback means that the entire instruction sequence is gone through one time. Continuous playback proceeds until an error condition occurs or a halt command is issued.

(3) Workpiece presence is checked prior to moving from the robot home position.

As previously discussed, the single or multiple light sources of the portable means or VPD can be LEDs, but lasers can be used with mirrors or light pipes to direct the radiation, for example (see also the source labeled $10A_1$ in FIG. 5B comprising three (or more) lights in a cluster or the distributed source $10A_2$ in FIG. 5C, which can be an arbitrarily-shaped source of illumination and fairly large to aid in finding the same). In addition, an appropriate focusing lens system can be incorporated into the system as well as a light stabilizing arrangement. The sequencer 11 can function in an ON-OFF mode but it can function, as well, to modulate intensity and frequency, and, of course, if the lights 10A, 10B, etc. differ from one another in terms of radiation frequency, the sequencer can determine the emitted radiation at any point in time during system operation.

Figure 10:
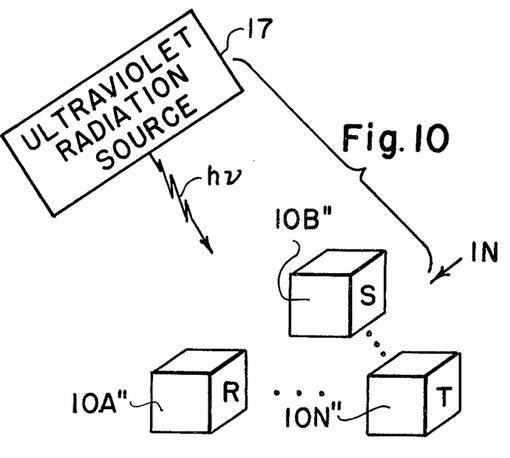
FIG. 10 shows a modification of the portable means of FIG. 1.

On the basis of the foregoing explanation, it will be appreciated that the portable means can take other forms: see the portable unit 1N in FIG. 10 comprising blocks 10A", 10B" . . . 10N" which may have one or more fluorescent surfaces that fluoresce under radiation from a source 17 of ultra-violet radiation. Other indicia or markings or codings may be used on the surfaces of the blocks 10A". . . ., as well as other configurations of elements making up the unit 1N, and the indicia, etc., may be such as can be read and interpreted by a human operator. Whatever is used, however, must be discernible by the television camera and identifiable thereby. Also, the sensors need not be television cameras; light sensitive diodes and transistors may be used.

The system herein disclosed promises to advance the technology of robot programming. A significant advantage of the system is that programming can be done with the robot arm inactive which allows the programmer to work safely inside the workspace. The accuracy of the visual robot instruction technique is limited to that which can be provided by the human hand and sensed by the robot's vision system.

The additional cost of a visual programming device of the type herein disclosed is low, provided the robot has a vision system for another purpose, such as, for example, noting worktable motion or for distinguishing workpieces by color or to halt the robot if the presence of an unpredicted object is detected. In the present apparatus, the vision system can also be used to communicate information to a computer-controlled robot without direct wire connections; by way of illustration, the VPD keyboard 5A can control the flicker rate of each LED in the portable array 1A.

Economic justification of the present technique must also take into account the frequency with which the robot will be reprogrammed. If reprogramming is infrequent and a vision system is not needed for other purposes, it is possible to share among several robots a single vision system which is used only during programming.

While the system disclosed herein to locate position in space and orientation in space is discussed with respect to its use in robot technology, the mechanism employed has wider use than that.

The computer 4 may be general purpose or special purpose; programming may be by software or by hardware, and the term is intended to include, as well, programmable logic arrays and discrete logic networks. The techniques herein disclosed may be used, by way of illustration, in connection with numerically controllable and tape controllable machine tools, automated paint sprayers, welding machines, adhesive applicators, and so fourth — in general machines that do not require high precision positioning (i.e., $\gtrsim 0.01$ inch).

Modifications of the invention herein disclosed will occur to persons skilled in the art, and all such modifications are deemed to be within the scope of the invention as defined by the appended claims.

What is claimed is:

1. A visual system to determine at least one of position in space and orientation in space and having, in combination: portable means arbitrarily movable in space and possessing the discernible properties of at least one of position in space and orientation in space; sensor means operatively disposed to extract visual information from the portable means and operable to convert it to an electrical signal; computer means that receives said electrical signal from the sensor means and evaluates the same to provide an indication of at least one of position in space and orientation in space; and means to specify the manner in which the visual information is to be interpreted by the computer means, said means to specify being operable to effect arbitrary interpretations of the manner in which the visual information is to be interpreted.

2. A visual system as claimed in claim 1 in which the portable means comprises light means.

3. A visual system as claimed in claim 2 wherein the light means comprises a single source of light.

4. A visual system as claimed in claim 3 wherein the single source is a light emitting diode.

5. A visual system as claimed in claim 3 that includes means operatively connected to sequence the single source of light to permit orientation in space to be computed using a sequence of images.

6. A visual system as claimed in claim 2 wherein sequencing of the light means is effected by modulating the light output of the source as a function of time and on a predetermined sequencing schedule.

7. A visual system as claimed in claim 2 wherein the light means comprises liquid crystals.

8. A visual system as claimed in claim 2 wherein the light means comprises an array of lights.

9. A visual system as claimed in claim 2 wherein the light means includes a legible code.

10. A visual system as claimed in claim 2 wherein the light means comprises laser means.

11. A visual system as claimed in claim 2 wherein the light means comprises a plurality of lights independently movable in space.

12. A visual system as claimed in claim 2 wherein the light means comprises a plurality of individual light sources.

13. A visual system as claimed in claim 12 that further includes means to sequence the light sources ON and OFF in a predetermined fashion.

14. A visual system as claimed in claim 12 wherein the light means comprises two distinct sources of light.

15. A visual system as claimed in claim 12 wherein the light means comprises three point sources of light disposed in a triangular configuration.

16. A visual system as claimed in claim 12 wherein the individual light sources emit different frequencies from one another.

17. A visual system as claimed in claim 2 wherein the light means is a distributed light source.

18. A visual system as claimed in claim 17 wherein the distributed light source comprises non-resolvable multiple lights each acting effectively as a point source.

19. A visual system as claimed in claim 18 wherein the multiple lights are light emitting diodes disposed adjacent to one another.

20. A visual system as claimed in claim 18 wherein some of the lights differ from others in terms of the frequency of radiation emitted therefrom.

21. A visual system as claimed in claim 2 wherein the light means comprises a plurality of clusters of lights.

22. A visual system as claimed in claim 2 wherein the light means comprises a plurality of distributed light sources.

23. A visual system as claimed in claim 1 wherein the means to specify is a keyboard.

24. A visual system as claimed in claim 23 wherein the keyboard means comprises binary devices.

25. A visual system as claimed in claim 23 wherein the keyboard means comprises finite state devices.

26. A visual system as claimed in claim 23 wherein the keyboard means comprises continuous state devices.

27. A visual system as claimed in claim 1 wherein the means to specify is voice input means.

28. A visual system as claimed in claim 1 wherein the portable means comprises light means and in which said means to specify comprises means to modulate the light means in terms of either intensity of frequency or in terms of both intensity and frequency.

29. A visual system as claimed in claim 1 wherein said means to specify comprises fixed program means to specify the manner in which the visual information is to be interpreted by the computer means.

30. Apparatus that includes the visual system of claim 1 and that further includes a robot, said computer means acting to control robot actions and movement on the basis of said visual information.

31. Apparatus as claimed in claim 30 wherein said robot is part of and performs automated functions in connection with a machine tool.

32. Apparatus as claimed in claim 30 wherein the means to specify is a keyboard.

33. Apparatus as claimed in claim 30 in which the portable means has two lights separated from one another and which includes means to change the distance between the light, the orientation of an imaginary line segment between the two lights serving as a source of orientation information and the position of the center of said imaginary line segment serving as a source of position information.

34. Apparatus as claimed in claim 30 in which the portable means comprises a plurality of lights separated from one another and means to change the distance between the individual lights, the orientations of imaginary line segments between the lights of said plurality serving as sources of orientation information and the position of the center of said imaginary line segments serving as a source of position information.

35. A visual system as claimed in claim 1 wherein the sensor means comprises a television camera positioned to view the portable means.

36. A visual system as claimed in claim 1 wherein the portable means comprises indirect light means.

37. A visual system as claimed in claim 36 wherein the portable means comprises visually detectable objects and which includes means to irradiate said objects.

38. A visual system as claimed in claim 37 wherein the visually detectable objects reflect light when irradiated by said means to irradiate.

39. A visual system as claimed in claim 37 wherein the visually detectable objects are fluorescent and in which the means to irradiate is a source of ultraviolet radiation.

40. A visual system as claimed in claim 39 wherein the visually detectable objects are liquid crystals.

41. A visual system as claimed in claim 1 wherein the sensor means comprises a plurality of television cameras.

42. A visual system as claimed in claim 1 wherein the sensor means comprises a solid state imaging array.

43. A visual system as claimed in claim 1 wherein the portable means comprises a plurality of individual sources of light disposed in an array, each source acting effectively as a point source of light in the system, and wherein the sensor means comprises a television camera positioned to view the plurality of sources and to extract visual information from which can be determined the position in space of said point source and the orientation of the array.

44. A visual system as claimed in claim 43 wherein the sensor means comprises a plurality of television cameras positioned to view the plurality of sources and to obtain position and orientation information therefrom.

45. A visual system as claimed in claim 1 wherein the portable means comprises three individual sources of light disposed in a triangular configuration, each source acting effectively as a point source of light in the system and wherein the sensor means comprises two television cameras positioned to view the three sources and to extract visual information from which can be determined the position in space of said source and the orientation in space of said configuration.

46. A visual system as claimed in claim 45 that further includes means to sequence the individual sources of light ON and OFF and to provide an indication to the computer means as to whether an individual source is ON or OFF.

47. A visual system as claimed in claim 45 wherein the three individual sources of light differ from one another in terms of the frequency of light emitted from each.

48. A visual system as claimed in claim 1 in which the portable means includes a plurality of individual units each of which unit is movable independently in space, each said unit serving to provide visual information to the sensor means.

49. A visual system as claimed in claim 1 in which the portable means comprises a plurality of three-dimensional objects.

50. A visual system as claimed in claim 49 wherein the three-dimensional objects are blocks.

51. A visual system as claimed in claim 49 wherein said blocks are cubes whose sides are individually and distinctively coded.

52. A visual system as claimed in claim 51 wherein the distinctive coding of the sides of the cubes obtains from the sensitivity of the individual sides to incident radiation.

53. A visual system as claimed in claim 1 wherein the portable means contains a code that can be read and interpreted by a human.

54. A visual system as claimed in claim 1 in which the portable means comprises a plurality of two-dimensional objects.

55. A visual system as claimed in claim 1 that further includes fiducial or reference means which occupies a spatial reference position from which can be determined other spatial positions of interest in the system.

56. A machine that includes said system in claim 55 and wherein said space is the working volume or region of the machine, interaction among the fiducial or reference means, the sensing means and the computer means serving to establish said spatial reference position within said working volume, the portable means thereafter being located in said space relative to the said spatial reference position and other elements of the machine within the space being located by the portable means.

57. A method of conveying at least one of position and orientation information that comprises: introducing to a space of interest at least one visually detectable object which possesses the discernible properties of at least one of position and orientation; sensing the presence of said object in said space to provide a signal that contains information or data relative to at least one of position and orientation of the object; arbitrarily specifying the manner in which said information or data is to be interpreted; and analyzing the information or data conveyed by the signal to extract therefrom said properties of the object.

58. A method as claimed in claim 57 wherein a plurality of visually detectable objects are introduced to the space of interest.

59. A system to instruct a robot and having, in combination: portable means arbitrarily movable in space and possessing the discernible properties of at least one of position in space and orientation in space, said portable means comprising two lights separated from one another and movable with respect to one another; means to change the distance between the two lights, the orientation of an imaginary line segment between the two lights serving as a source of visual orientation information and the position of the center of said imaginary line segment serving as a source of visual position information; sensor means operatively disposed to extract visual information from the portable means that receives said electrical signal from the sensor means; and computer means that evaluates the same to provide an indication of at least one of position in space and orientation in space; and a robot, said computer means serving to control robot actions and movement on the basis of said visual information.

60. A visual system to determine position in space and orientation in space and having, in combination: portable means arbitrarily movable in space and possessing the discernible properties of at least one of position in space and orientation in space, said portable means comprising a plurality of individual sources of light disposed in an array, each source acting effectively as a point source of light in the system; sensor means operatively disposed to extract visual information from the portable means and operable to convert it to an electrical signal, said sensor means comprising a television camera positioned to view the plurality of sources and to extract visual information from which can be determined the position in space of said point source and the orientation of the array; and computer means that receives said electrical signal from the sensor means and evaluates the same to provide an indication of position in space and orientation in space.

61. A system to determine at least one of position in space and orientation in space and having, in combination: portable means arbitrarily movable in space and possessing the discernible properties of at least one of position in space and orientation in space; sensor means operatively disposed to extract spatial information from the portable means and operable to convert it to an electrical signal; computer means that receives said electrical signal from the sensor means and evaluates the same to provide an indication of at least one of position in space and orientation in space; and fiducial or reference means which occupies a spatial reference position from which can be determined other spatial positions of interest in the system.

* * * * *